(12) United States Patent
Pacho Millán et al.

(10) Patent No.: US 11,198,967 B2
(45) Date of Patent: Dec. 14, 2021

(54) SHIPPING BOLT SPACER AND METHOD OF USE THEREOF

(71) Applicant: A. Raymond et Cie, Grenoble (FR)

(72) Inventors: Sandra Pacho Millán, Barcelona (ES); David Fol Barragan, Barcelona (ES)

(73) Assignee: A. RAYMOND ET CIE, Grenoble (FR)

( * ) Notice: Subject to any disclaimer, the term of this patent is extended or adjusted under 35 U.S.C. 154(b) by 172 days.

(21) Appl. No.: 16/402,875

(22) Filed: May 3, 2019

(65) Prior Publication Data
US 2019/0338456 A1 Nov. 7, 2019

(30) Foreign Application Priority Data

May 3, 2018 (EP) .................................. 18382308

(51) Int. Cl.
*F16B 5/02* (2006.01)
*D06F 39/00* (2020.01)
*F16B 21/09* (2006.01)

(52) U.S. Cl.
CPC ............ *D06F 39/001* (2013.01); *F16B 21/09* (2013.01)

(58) Field of Classification Search
CPC ...... F16B 5/0241; F16B 5/2058; F16B 19/02; F16B 21/09; D06F 39/001
USPC .................................................. 411/546, 437
See application file for complete search history.

(56) References Cited

U.S. PATENT DOCUMENTS

| | | | | |
|---|---|---|---|---|
| 2,818,764 A | * | 1/1958 | Switzer | F16B 5/0291 411/437 |
| 3,006,231 A | * | 10/1961 | Kahn | F16B 5/0291 411/435 |
| 4,909,692 A | * | 3/1990 | Hendren | F16B 43/00 174/57 |

(Continued)

FOREIGN PATENT DOCUMENTS

| | | |
|---|---|---|
| CN | 201944077 U | 8/2011 |
| EP | 1491675 B1 | 3/2011 |

(Continued)

OTHER PUBLICATIONS

Machine assisted English translation of CN201944077U obtained from https://patents.google.com on May 2, 2019, 3 pages.

(Continued)

*Primary Examiner* — Flemming Saether
(74) *Attorney, Agent, or Firm* — Warner Norcross + Judd LLP (57) ABSTRACT

The present disclosure provides a spacer for a shipping bolt. In one embodiment, the spacer includes a head, an elongated body, and an insert. The head and the elongated body each comprise a durometer greater than the insert. Together, the head and the elongated body provide a structure within which the insert is disposed to absorb forces otherwise imposed upon a bolt inserted through the spacer. The disclosure also provides a method of using the spacer to secure a component of an appliance. In a second embodiment, the spacer is of a unitary construction and manufactured of an elastomeric material. In the second embodiment the spacer is configured to absorb forces imposed upon a bolt inserted therethrough, using a combination of specially designed ribs and webs interconnecting concentric cylinders that partially define the opening.

10 Claims, 6 Drawing Sheets

(56) References Cited

U.S. PATENT DOCUMENTS

| | | | |
|---|---|---|---|
| 5,782,597 A * | 7/1998 | Meyer | F16B 37/0842 411/433 |
| 7,441,420 B2 | 10/2008 | Kim et al. | |
| 9,279,208 B2 * | 3/2016 | Sul | D06F 37/264 |
| 9,279,210 B2 * | 3/2016 | Perini | D06F 39/001 |
| 10,837,136 B2 * | 11/2020 | Rineer | B65D 85/68 |
| 2009/0074535 A1 | 3/2009 | Roberts et al. | |
| 2013/0071203 A1 | 3/2013 | Hay | |
| 2016/0069381 A1 * | 3/2016 | Antonucci | H02G 3/10 411/547 |
| 2018/0266461 A1 | 9/2018 | Cheynet de Beaupre et al. | |
| 2021/0079948 A1 * | 3/2021 | Xie | F16B 19/02 |

FOREIGN PATENT DOCUMENTS

| | | |
|---|---|---|
| EP | 1498537 B1 | 5/2012 |
| EP | 1929082 B1 | 1/2013 |
| EP | 1939346 B1 | 6/2014 |
| EP | 2657390 B1 | 12/2014 |
| ES | 2253032 A1 | 5/2006 |
| WO | 2003001071 A1 | 1/2003 |
| WO | 2010040658 A1 | 4/2010 |
| WO | 2016102792 A1 | 6/2016 |

OTHER PUBLICATIONS

Machine assisted English translation of EP1491675B1 obtained from https://patents.google.com on May 2, 2019, 9 pages.
Machine assisted English translation of EP1498537B1 obtained from https://patents.google.com on May 2, 2019, 9 pages.
Machine assisted English translation of EP1929082B1 obtained from https://patents.google.com on May 2, 2019, 9 pages.
Machine assisted English translation of ES2253032A1 obtained from https://patents.google.com on May 2, 2019, 5 pages.
Machine assisted English translation of WO2003001071A1 obtained from https://patents.google.com on May 2, 2019, 5 pages.

* cited by examiner

FIG. 6

SHIPPING BOLT SPACER AND METHOD OF USE THEREOF

CROSS-REFERENCE TO RELATED APPLICATIONS

This application claims priority to and all advantages of European Patent Appl. No. 18382308.7 filed on 3 May 2018, the content of which is hereby incorporated by reference.

FIELD OF THE INVENTION

The present disclosure generally relates to a shipping bolt spacer. More specifically, the disclosure relates to a spacer for use in packing and transporting household appliances, and a method of using the same.

DESCRIPTION OF THE RELATED ART

Shipping bolts are used to facilitate securement of a component of an appliance (e.g. a drum of a washing machine) to a surface so that the component does not shift rapidly under forces imposed during shipping and become damaged. Shipping bolts are typically provided as an assembly that includes a bolt and a spacer. The spacer typically includes a base, a longitudinal portion extending from the base, and an opening that passes through both the base and the longitudinal portion and is configured to receive a shaft of the bolt. During use, the longitudinal portion of the spacer is inserted through an aperture in a panel of the appliance and a bolt is then fed through the opening of the spacer (e.g. shaft first) and secured to the component of the appliance.

SUMMARY OF THE INVENTION

A shipping bolt spacer is provided herein. In an exemplary embodiment, the spacer includes an elongated body, an elastomeric insert, and a head. The elongated body of the spacer defines a longitudinal opening that extends through the elongated body and includes axial grooves extending in a lengthwise direction along the elongated body. The elastomeric insert of the spacer includes a stem and a base, and defines a through-hole configured to receive a bolt. The stem of the elastomeric insert is disposed within the longitudinal opening of the elongated body and includes axial ridges corresponding to and disposed within the axial grooves defined by the elongated body. The base of the elastomeric insert includes a flange that protrudes radially outward from the stem of the elastomeric insert. The head of the spacer is disposed adjacent the flange and defines an opening for passage of the bolt.

A method of securing a component of an appliance with the shipping bolt spacer is also provided. The method includes disposing the elongated body of the spacer into an aperture of a panel of the appliance. The method also includes disposing a bolt through both the opening of the head and also the through-hole of the elastomeric insert of the spacer. The method further includes securing the bolt to the component of the appliance, such that the spacer is positioned to absorb impact forces from the appliance, thereby reducing impact forces imparted to the bolt from the appliance during shipping.

Additional embodiments of the shipping bolt spacer are also provided. In another exemplary embodiment, the spacer includes an elongated body that defines a longitudinal opening therethrough. The elongated body includes a first end portion, a second end portion, and an intermediate portion located between the first and second end portions. The intermediate portion includes lengthwise portions that extend between the first and second end portions. The lengthwise portions are interconnected by ribs, which are oriented in alternating directions and disposed about the longitudinal opening of the elongated body. The spacer also includes a head that is integrally joined to the first end portion of the elongated body and protrudes radially outwardly therefrom.

As described further below, the shipping bolt spacer provides for an improved capacity to absorb various forces exerted during shipping, thereby reducing forces imparted on an appliance and a bolt used to secure a component of the same during shipping.

These and other features and advantages of the present disclosure will become apparent from the following description of particular embodiments, when viewed in accordance with the accompanying drawings and appended claims.

DETAILED DESCRIPTION OF THE INVENTION

A shipping bolt spacer is described below. As will be appreciated from the description herein, the shipping bolt spacer, also referred to herein as the "spacer," is suitable for use in packing and transporting household appliances, such as washing machines. In particular, the spacer is configured to function in combination with a bolt as a shipping bolt (i.e., an assembly including the spacer and the bolt). Such a shipping bolt may be used to secure one component of a household appliance (e.g. a drum of a washing machine) to another component of the appliance (e.g. a back panel of the washing machine) to prevent potentially damaging motions of one of the components during transport of the appliance (e.g. shipment via vehicle). The spacer provided herein functions through the various elements thereof, as described below, to absorb forces exerted by the appliance during transport, thereby reducing forces imparted to the bolt. As such, certain features of the spacer may be considered functional, but may also be implemented in different aesthetic configurations.

Figure 1:
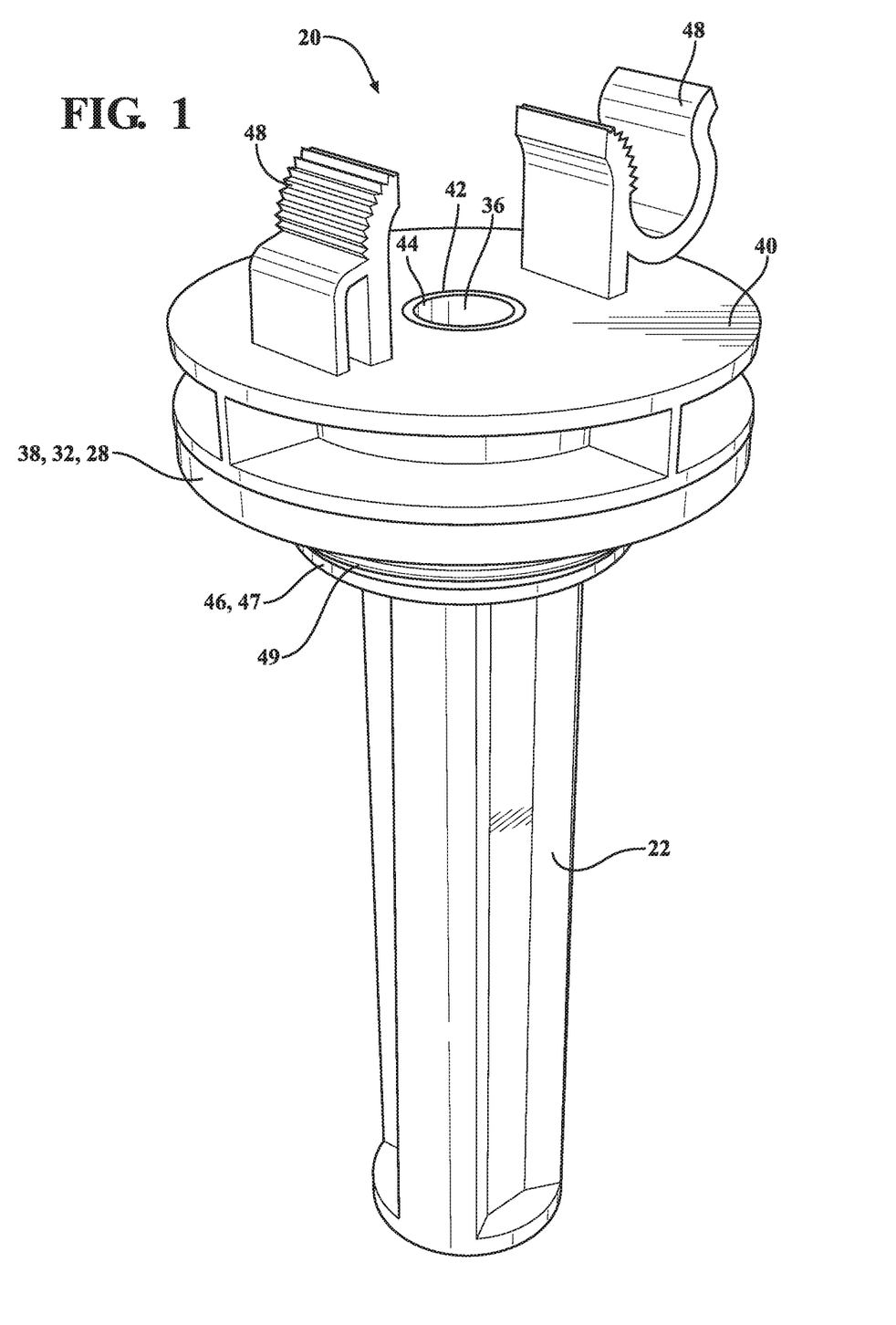
FIG. 1 is a side perspective view of the shipping bolt spacer in accordance with one embodiment.
Figure 2:
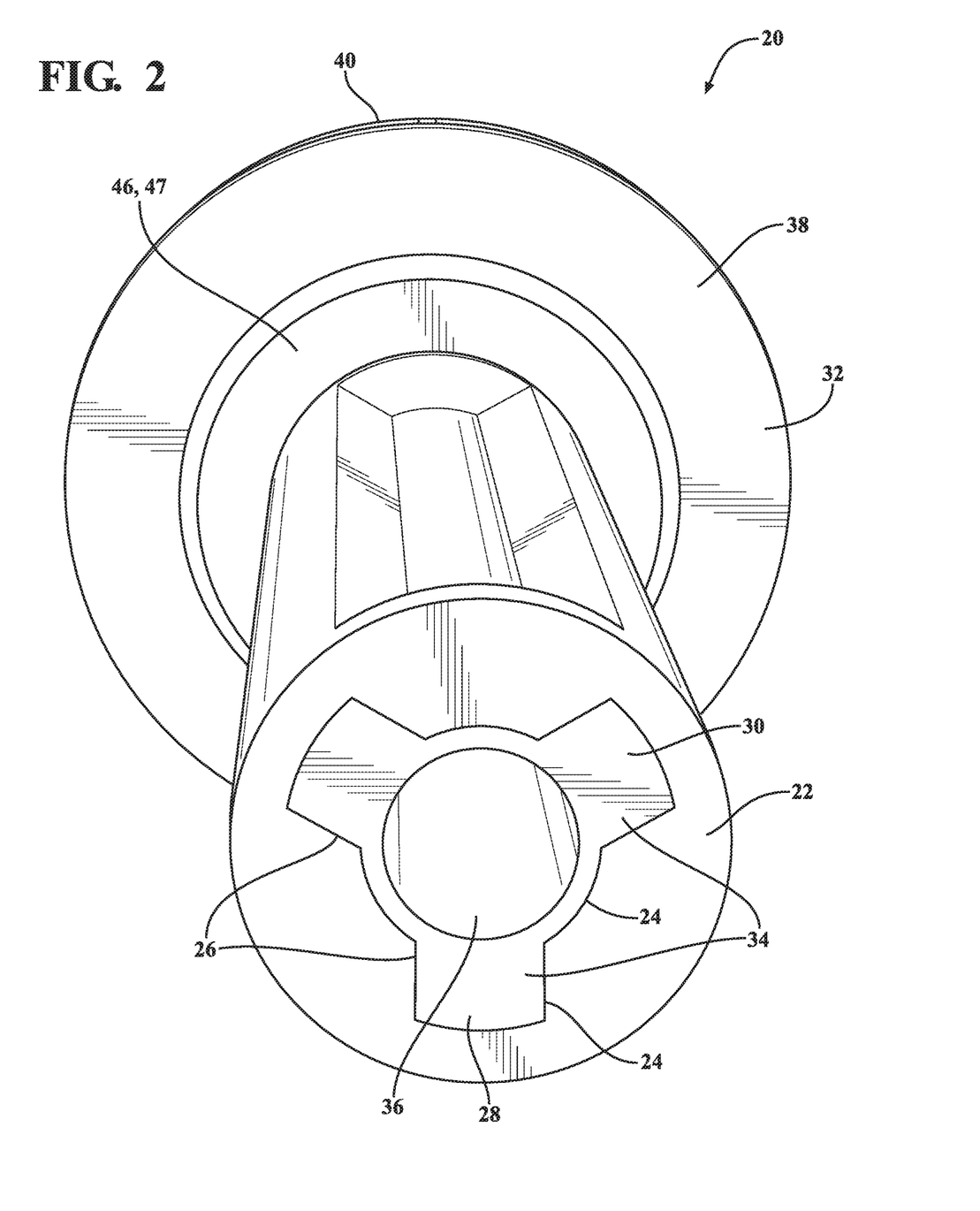
FIG. 2 is a bottom perspective view of the shipping bolt spacer in accordance with the embodiment shown in FIG. 1.
Figure 3:
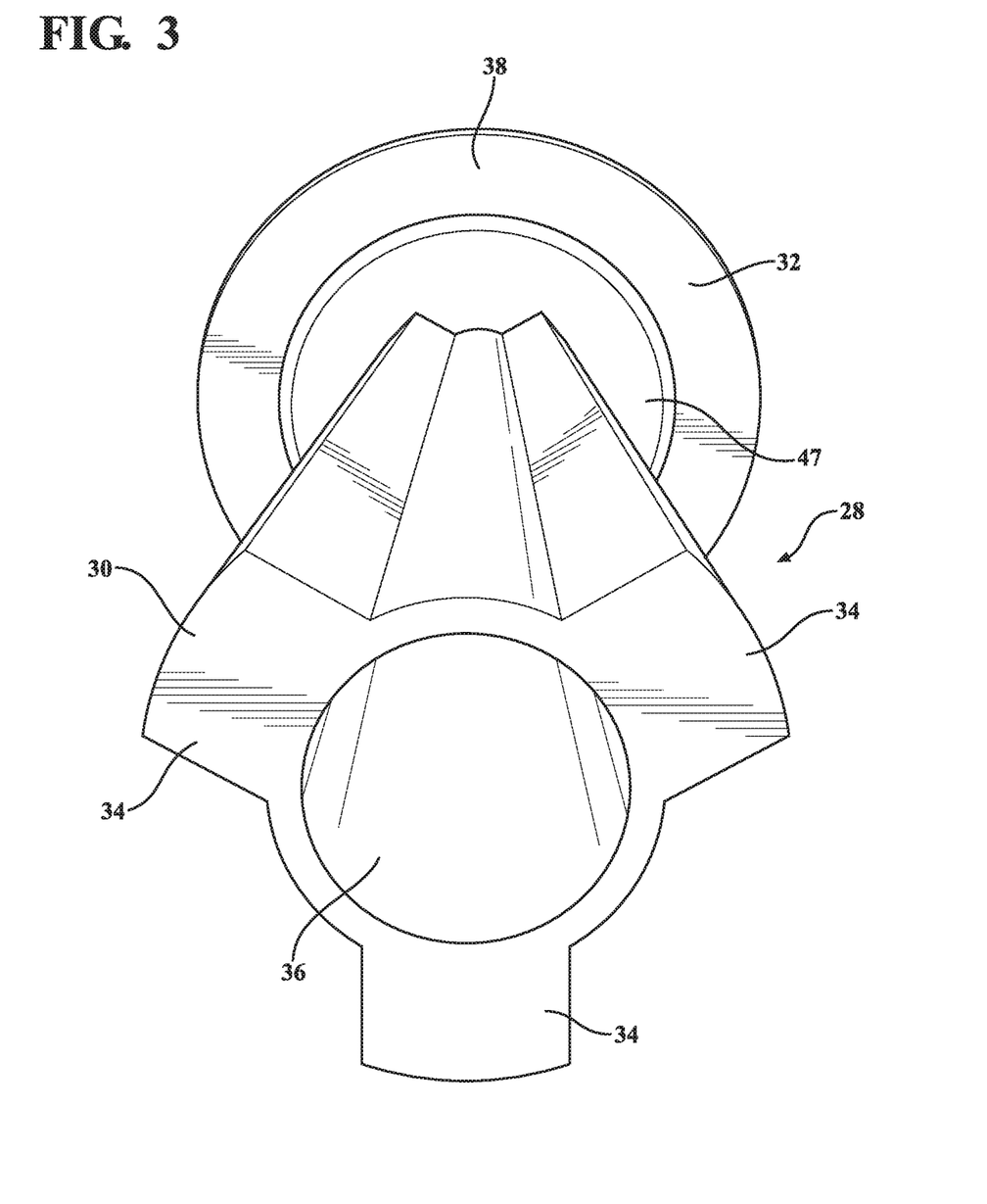
FIG. 3 is a bottom perspective view of an elastomeric insert of the shipping bolt spacer in accordance with the embodiment shown in FIG. 1.

In an exemplary embodiment shown in FIGS. 1-3, wherein like numerals indicate corresponding parts throughout the several views, the shipping bolt spacer is illustrated and generally designated at 20. The spacer 20 includes an elongated body 22, an elastomeric insert 28, and a head 40 which, when joined together, can receive a bolt for securing a first component of an appliance to a second component of an appliance. Each such feature of the spacer 20 of FIGS. 1-3 is separately discussed below.

As best shown in FIG. 2, the elongated body 22 defines a longitudinal opening 24. The longitudinal opening 24 includes axial grooves 26, which each extend in a lengthwise direction along the elongated body 22. Although three axial grooves 26 are shown in the exemplary embodiment, the spacer 20 may include any number of axial grooves 26 (e.g., 2, 3, 4, 5, or more). Likewise, the axial grooves 26 may be located in any arrangement around the longitudinal opening 24, and may be of any shape and size. For example, the axial grooves 26 may be spaced equidistant from one another about a circumference of the longitudinal opening 24, as shown in FIG. 2. Alternatively, the axial grooves 26 may be spaced from one another in varying distances, which may be independently selected, e.g. based on one or more dimension of the spacer 20, the number of axial grooves 26, a configuration of another component of the spacer 20, such as those described below, etc. Similarly, the shape and size of each of the axial grooves 26 is not limited and may be independently selected, e.g. based on the number of axial grooves 26, a manufacturing technique used to form the elongated body 22 or another component of the spacer 20, such as those described below. Accordingly, while three identical axial grooves 26 are shown in the exemplary embodiment, each of the axial grooves 26 may be independently selected, such that any one of the axial grooves 26 may be the same as or different from any other of the axial grooves 26.

The elastomeric insert 28 is sized to be at least partially received within the elongated body 22 and includes a stem 30 and a base 32. The stem 30 of the elastomeric insert 28 is disposed within the longitudinal opening 24 of the elongated body 22, and includes axial ridges 34 that correspond to and are disposed within the axial grooves 26 of the elongated body 22. The stem 30 defines a through-hole 36, which is configured to receive a bolt (not shown). As such, the through-hole 36 may be a straight bore or may be threaded. The base 32 of the elastomeric insert 28 includes a flange 38, which protrudes radially outwardly from the stem 30 of the elastomeric insert 28. Typically, the flange 38 protrudes for a distance greater than a radius of the elongated body 22, such that a portion of the flange 38 extends beyond an outer perimeter of the elongated body 22.

The head 40 is sized to fit over the base 32 of the elastomeric insert 28, such that the flange 38 is disposed between the head 40 and the elongated body 22. The head 40 defines an opening 42, which is concentric with the through-hole 36 of the elastomeric insert 28 and also configured to receive the bolt. As such, the opening 42 of the head 40 may also be a straight bore or threaded. In certain embodiments, the elastomeric insert 28 includes a boss 44 that is disposed within the opening 42 of the head 40. In such embodiments, the boss 44 is configured to securely fit inside the opening 42 and thereby secure the head 40 to the elastomeric insert 28. In these embodiments, the opening 42 of the head 40 is sized larger than the bolt, and the through-hole 36 of the elastomeric insert extends through the boss 44 such that the boss 44 is configured to receive a portion of the bolt within the opening 42 of the head 40. In some embodiments, the head 40 includes securement members 48, which are configured to receive, or be fastened or attached to, a portion of a hose, cable, or the like. Of course, the head 40 may include any number of securement members 48, which may be the same as or different from one another. In these embodiments, the securement members 48 typically extends from a surface of the head 40, such as a top surface or a side surface.

In certain embodiments, the spacer 20 further includes a disk-shaped pedestal 46 that protrudes radially outwardly from the elongated body 22, such that the flange 38 of the elastomeric insert 28 is sandwiched between the pedestal 46 and the head 40. In these or other embodiments, the base 30 of the elastomeric insert 28 includes a cylindrical portion 47 having a circumference that conforms to an inner perimeter of an aperture in an appliance (not shown). The cylindrical portion 47 typically includes a lip 49, which has an outer diameter greater than the inner perimeter of the aperture and functions to provide resistance to withdrawal of the spacer 20 once inserted into the aperture.

The various elements of the components of the spacer 20 described above, e.g. the elongated body 22, the elastomeric insert 28, and the head 40, may be manufactured of the same or different material(s), such as any one or more of the materials described below. Moreover, each element may itself comprise a combination of different materials, and thus may not comprise a homogeneous composition throughout. In general, materials suitable for use in or as the elongated body 22, the elastomeric insert 28, and the head 40 include metals (e.g. steels, aluminums, alloys, etc.), resins (e.g. thermoset and/or thermoplastic resins), and combinations thereof.

In some embodiments, the elongated body 22, the elastomeric insert 28, and the head 40 each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA); polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR);

polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

In some embodiments, the spacer 20 comprises a polyamide. Examples of suitable polyamides include those formed by the reaction of a diamine monomer and a diacid crosslinker. Specific examples of such suitable polyamides include polycaproamide (Nylon 6), polyhexamethyleneadipamide (Nylon 66), polytetramethyleneadipamide (Nylon 46), poly hexamethylenesebacamide (Nylon 610), polyhexamethyl enedodecamide (Nylon 612), polyundecaneamide, poly dodecaneamide, hexamethyleneadipamide/caproamide copolymer (Nylon 66/6), caproamide/hexamethyleneterephthalamide copolymer (Nylon 6/6T), hexamethyleneadipamide/hexamethyleneterephthalamide copolymer (Nylon 66/6T) hexamethyleneadipamide/hexamethyleneisophthalamide copolymer (Nylon 66/6I), hexamethyleneadipamide/hexamethyleneisophthalamide/caproamide copolymer (Nylon 66/6I/6), hexamethyleneadipamide/hexamethylene terephthalamid/carpoamide copolymer (Nylon 66/6T/6), hexamethyleneterephthalamide/hexamethyleneisophthalamide copolymer (Nylon 6T/6I), hexamethyleneterephthalamide/dodecanamide copolymer (Nylon 6T/12), hexamethyleneadipamide/hexamethyleneterephthalamide/hexamethyleneisophthalamide copolymer (Nylon 66/6T/6I), polyxylyleneadipamide, hexamethyleneterephthalamide/2-methyl pentamethyleneterephthalamide copolymer, polymetaxylylenediamineadipamide (Nylon MXD6), polynonamethyleneterephthalamide (Nylon 9T), and combinations thereof. In particular embodiments, at least one of the elongated body 22 and the head 40 comprises the polyamide. In certain embodiments, each of the elongated body 22 and the head 40 independently comprise the polyamide, which is independently selected for each of the elongated body 22 and the head 40.

In certain embodiments, the resin is a reinforced resin. In some of these embodiments, the resin comprises, or is utilized in combination with, a fibrous material comprising fiber(s) of carbon, basalt, natural compounds (i.e., natural fibers), metals, polymer-based fiber(s) such as aramid (e.g. Kevlar, Nomex, Technora), and the like, or combinations thereof. It is to be appreciated that the term "fiber(s)" can denote a single fiber and/or a plurality of fibers. Herein, use of the term "fiber(s)" denotes one or more individual fibers, which can be independently selected based on composition, size, length, and the like, or combinations thereof. For clarity and consistency, reference to "the fiber(s)" is made herein, which is not intended to refer to but one fiber, but to any one fiber, which may be independently selected. The description below may relate to a single fiber, or all of the fibers, utilized. The term "fiber(s)" also encompasses particles and particulates, i.e., the fibers need not have an elongated form or shape. The fiber(s) may comprise any material, including combinations of materials, such as a combination of different fiber(s). Typically, the fiber(s) are glass fiber(s) and/or carbon fiber(s), such that an individual component (e.g. the elongated body 22 and/or the head 40) comprises a fiberglass and/or a carbon fiber, respectively. The term "fiberglass" is to be understood to also encompass resins conventionally known as fiber-reinforced resins. In particular embodiments, at least one of the elongated body 22 and the head 40 comprises the reinforced resin. In certain embodiments, each of the elongated body 22 and the head 40 independently comprise the reinforced resin, which is independently selected for each of the elongated body 22 and the head 40. In some such embodiments, the reinforced resin is a fiber-reinforced polyamide.

While independently selected, the elongated body 22 and the head 40 typically comprise the same, or similar material (e.g. in composition, type, or based on a physical property or characteristic). In some embodiments, the elongated body 22 and the head 40 each comprise an independently selected polyamide resin, and the elastomeric insert 28 comprises a thermoplastic elastomer. Specific examples of the thermoplastic elastomer include polyolefin thermoplastic elastomers. In certain embodiments, the thermoplastic elastomer comprises polyethylene, polypropylene, polybutylene, or a combination thereof.

Typically, the various elements of the spacer 20 (e.g. the elongated body 22, the elastomeric insert 28, the head 40, etc.) are manufactured of materials that are independently selected to achieve certain physical properties and performance characteristics suitable for the intended use and function of each element, as described herein. Generally, the materials are selected in order to provide the spacer 20 with shock-absorbing properties, i.e., an ability to absorb and/or dissipate a force imparted to the spacer during use (e.g. during shipment of an appliance secured with a shipping bolt comprising the spacer 20). As such, the materials are independently selected, e.g. in view of each other and desired individual and combined performance characteristics, to provide the spacer 20 with an ability to absorb and/or dissipate radial, torsional, axial, and/or flexural forces. In doing so, the spacer 20 is suited to reduce the amount of such forces imparted to the bolt when used in combination with the spacer 20 (i.e., as a shipping bolt).

Typically, the elongated body 22 and the head 40 each independently comprise a durometer greater than a durometer of the elastomeric insert 28 (e.g. according to ASTM standard D2240). Said differently, the elastomeric insert 28 typically comprises a durometer less than both the durometer of the elongated body 22 and the durometer of the head 40. In certain embodiments, without being bound by theory, it is believed that the difference in durometers, in combination with the design of the spacer 20, provides for increased absorption and/or dissipation of forces imparted to a bolt when utilized in combination with the spacer 20 in a shipping bolt, as described above. As such, the elongated body 22 and the head 40 may each independently comprise another material property (e.g. hardness, compressibility, viscoelasticity, elastic modulus, etc.), in addition to or instead of durometer, evidencing an increased relative hardness of the elongated body 22 and the head 40 as compared a decreased relative harness of the elastomeric insert 28.

An exemplary method of using of the spacer 20 includes disposing the elongated body 22 within an aperture in a panel (e.g. a back panel) of an appliance (e.g. a washing machine), thereby positioning flange 38 adjacent a surface of the appliance (e.g. surrounding the aperture). The method also includes disposing a bolt through the opening 42 of the head 40 and through-hole 36 of the stem 30, such that stem 30 is disposed about the bolt, thereby forming a shipping bolt comprising the spacer 20. The method further includes threadibly securing the bolt to a component of the appliance (e.g. an inner drum of the washing machine), thereby securing the component to the panel of the appliance with the shipping bolt comprising the spacer 20. The bolt may be threadibly secured to the component by threading into a threaded bore defined by the component, via use of a nut captured by the component, etc. In such a configuration, the spacer 20 is disposed about the bolt and between the component and the panel of the appliance, and thus positioned to absorb forces imparted therebetween during shipping.

In certain embodiments, the method further comprises securing the appliance to a structure (e.g. a wall or a rack of a transport vehicle) via the securement members 48. After shipment, e.g. when the appliance is delivered and is ready for use, the bolt may be unthreaded from the threaded bore of the component, and the spacer 20 and the bolt then removed from the appliance. As such, the method may additionally comprise unsecuring the bolt from the component and, also optionally, removing the bolt and the spacer 20 from the appliance. In this fashion, the spacer 20, and the shipping bolt formed therewith, may be reused. Accordingly, the method above may be understood as forming the shipping bolt with the spacer 20, securing the component of the appliance for shipping with the spacer 20 or the shipping bolt formed therefrom, reducing forces imparted to the bolt and/or the appliance (e.g. the panel and/or the component) with the spacer 20 during shipment of the appliance, and securely shipping the appliance via utilizing the spacer 20.

Figure 4:
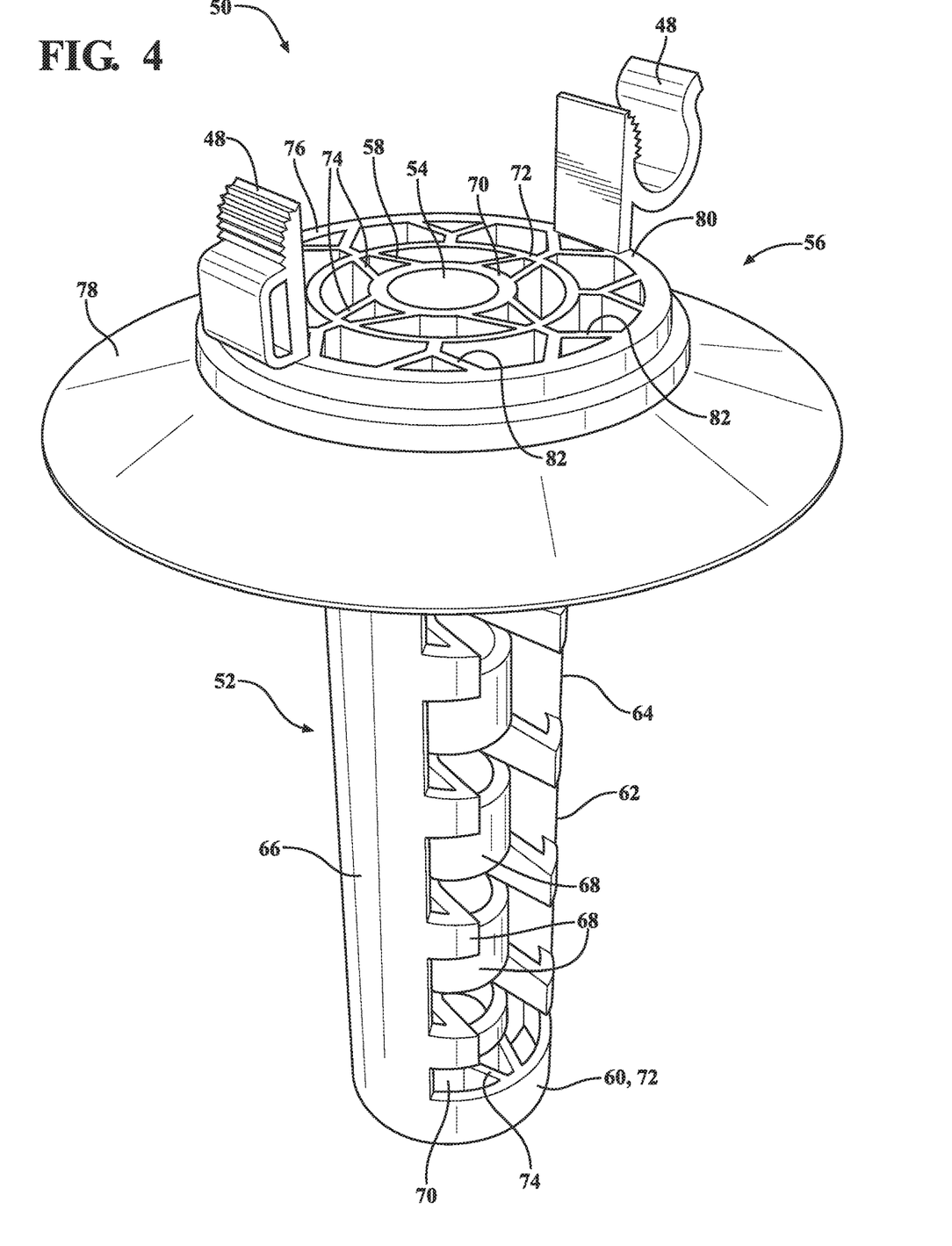
FIG. 4 is a side perspective view of the shipping bolt spacer in accordance with an additional embodiment.
Figure 5:
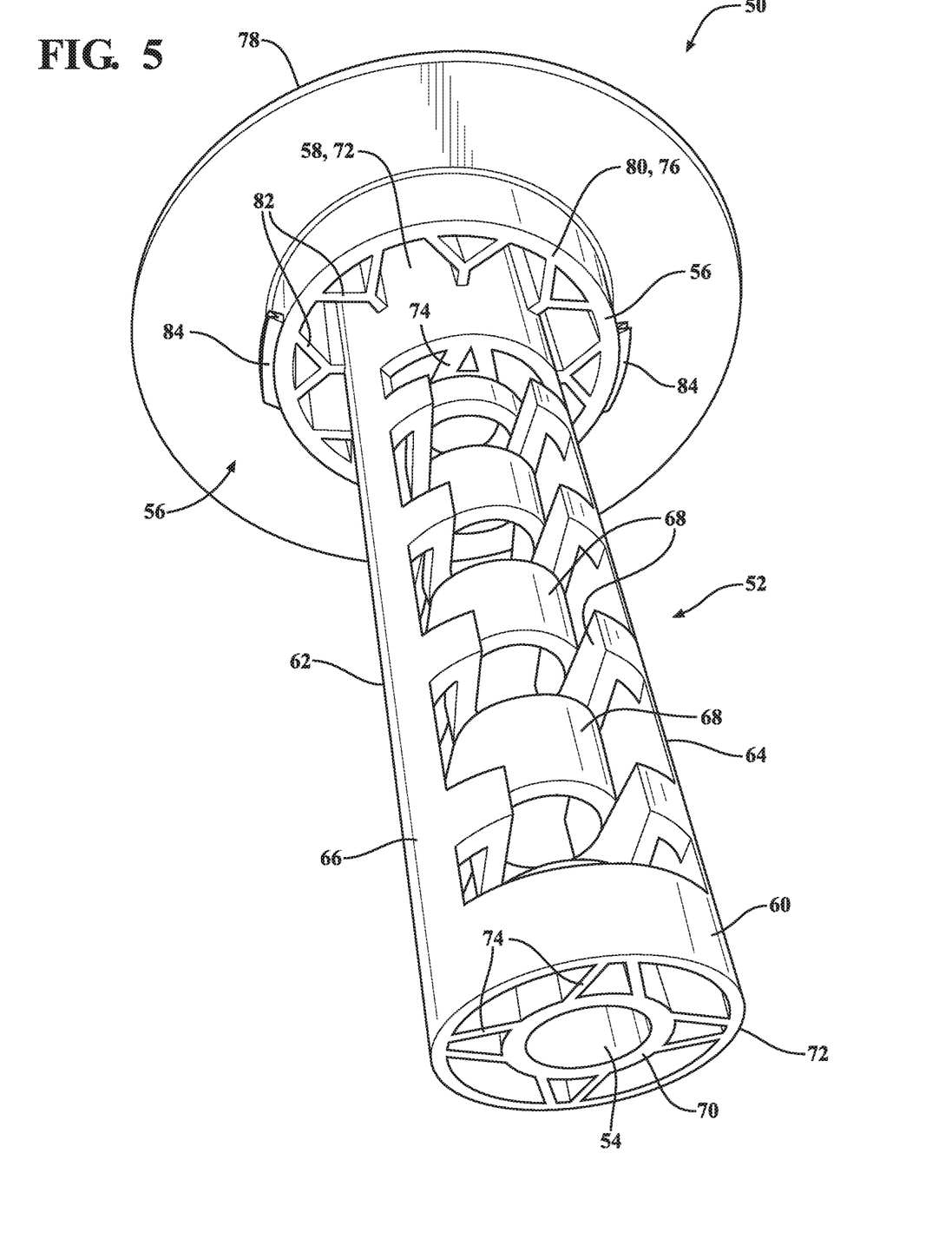
FIG. 5 is a bottom perspective view of the shipping bolt spacer in accordance with the embodiment shown in FIG. 4.
Figure 6:
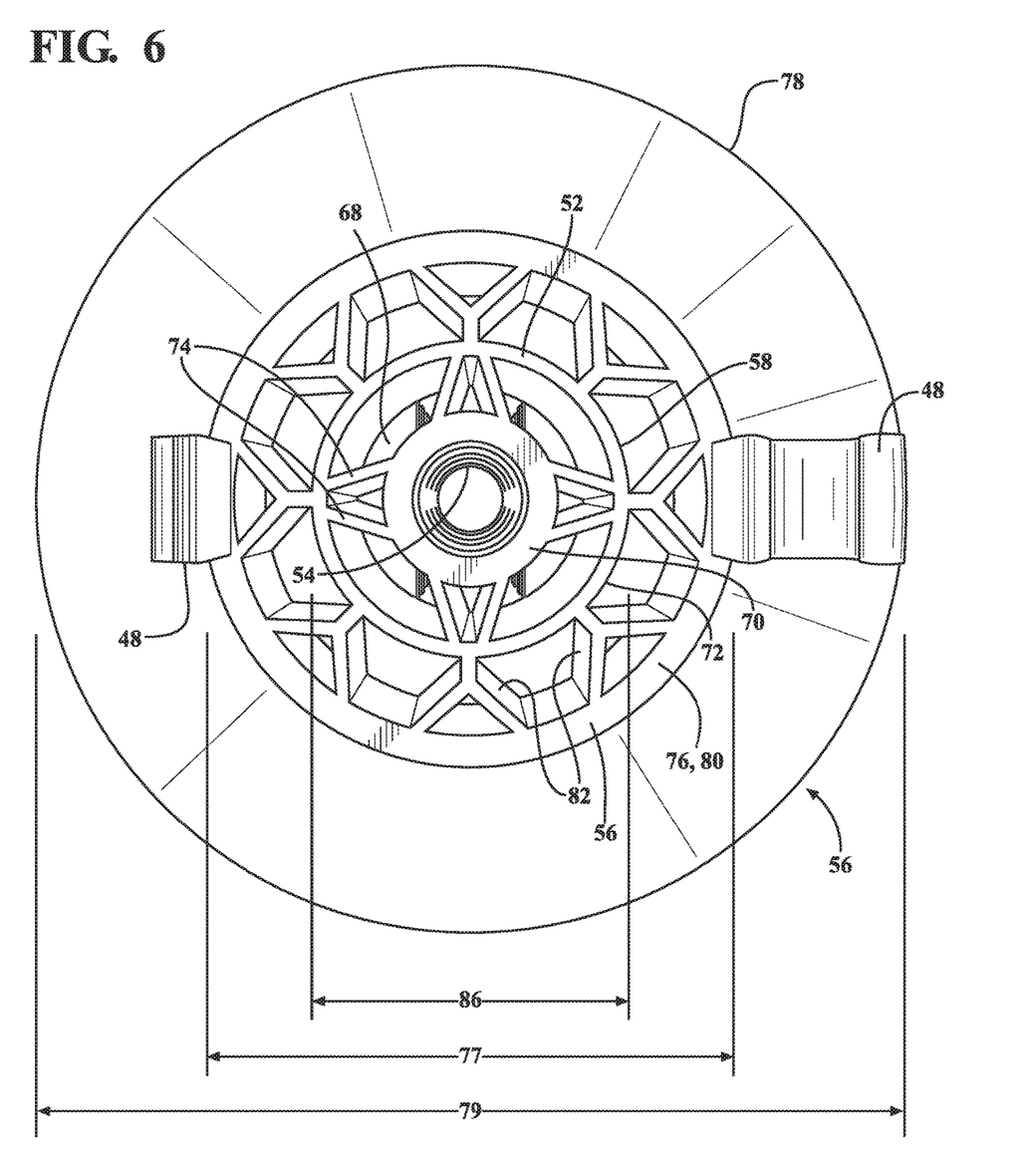
FIG. 6 is a top view of the shipping bolt spacer in accordance with the embodiment shown in FIG. 4.

In another exemplary embodiment shown in FIGS. 4-6, wherein like numerals indicate corresponding parts throughout the several views, a second embodiment of the spacer is illustrated and generally designated at 50. The spacer 50 comprises a unitary construction, and includes an elongated body 52 and a head 56 integrally joined to the elongated body 52. The elongated body 52 defines a longitudinal opening 54 extending therethrough, and the head 56 protrudes radially outward from the elongated body 52. Each such feature of the spacer 50 of FIGS. 4-6 is separately discussed below.

The elongated body 52 includes a first end portion 58, a second end portion 60, and an intermediate portion 62 located between the first and second end portions 58, 60. The intermediate portion 62 includes a first lengthwise portion 64, and a second lengthwise portion 66 located opposite the first lengthwise portion 64 about the elongated body 52. The first and second lengthwise portions 64, 66 each extend along the elongated body 52 between the first and second end portions 58, 60. While two lengthwise portions (64, 66) are shown, any number of lengthwise portions may be utilized, such as two, three, four, or more lengthwise portions. Moreover, the lengthwise portions (64, 66) may be oriented in any configuration about the longitudinal opening 54, and need not be located opposite one another. Typically, the lengthwise portions (64, 66) are spaced equidistant about the longitudinal opening 54.

The elongated body 52 also comprises ribs 68, which interconnect the first and second lengthwise portions 64, 66, and any additional lengthwise portions (if present). In the exemplary embodiment, each of the ribs 68 is connected to and extends between the first lengthwise portion 64 and the second lengthwise portion 66 of the elongated body 52. Between the first and second lengthwise portions 64, 66, the ribs 68 extend into and about a portion of the longitudinal opening 54. In this sense, the ribs 68, collectively, define a portion of the longitudinal opening 54 that is configured to receive a bolt. Typically, the ribs 68 extend into the longitudinal opening 54 in multiple directions. As such, each of the ribs 68 may individually extend into the longitudinal opening 54 (i.e., are oriented) in any direction. Typically, however, the ribs 68 are oriented in alternating directions, e.g. where each individual rib of the ribs 68 is oriented in the opposite direction with respect to adjacent individual ribs. The ribs 68 may comprise any shape, and may define any overall shape. Likewise, each of the ribs 68 may be the same as or different from another of the ribs 68, e.g. with respect to shape, length, orientation, etc. Typically, the ribs 68 each comprise a U-shape, or are substantially U-shaped, with a curved portion recessed within the longitudinal opening 54 of the elongated body 52. In some instances, the ribs 68 each comprise a U-shaped portion and also a bend or projection (not numbered) where connected to each of the first and second lengthwise portions 64, 66. In such instances, the ribs 68 may comprise an overall shape generally resembling the Greek letter omega (Ω) when viewed along an axis about which the longitudinal opening 54 extends. Alternatively, the ribs 68 may each comprise a V-shape, a squared shape, an arcuate shape, or the like. In some embodiments, the ribs 68 may comprise individual ribs of varying shapes.

The ribs 68 described above function individually and in combination to absorb radial forces exerted upon spacer 50, thereby also reducing the forces imparted on a bolt when used in combination with the spacer 50. In particular, the ribs 68, as described above, are each configured to act as shock-absorber, e.g. through flexure. Additionally, the force absorption of the intermediate portion 62 of the elongated body 52 as a whole is enhanced by inclusion of the first and second lengthwise portion 64, 66 in combination with the ribs 68.

In certain embodiments, each of the first and second end portions 58, 60 of the elongated body 52 includes an inner cylinder 70 and an outer cylinder 72. In such embodiments, the inner and outer cylinders 70, 72 are typically interconnected by webs 74. The configuration of the webs 74 interconnecting the concentric cylinders have dual functionality. First, the webs 74 function to absorb torsional forces (e.g. by flexing) exerted upon the spacer 50 during use, thereby reducing the forces imparted on the bolt used in combination with the spacer 50, as described above. Second, the webs 74 also function to absorb flexural forces and radial forces exerted upon the shipping bolt, thereby also reducing the forces imparted on the bolt when used in combination with the spacer 50. The inner cylinders 70 are disposed about a portion of the longitudinal opening 54 and each define a through-hole configured to receive a bolt. More specifically, the through-holes defined by the inner cylinders 70 are concentrically aligned with the portion of the longitudinal opening 54 defined by ribs 68, such that a bolt can be disposed through the inner cylinders 70 and the ribs 68.

The head 56 of the spacer 50 includes a base 76 and a flange 78. The base 76 comprises a width 77 (e.g. a diameter 77 when the base 76 comprises a circular shape, as shown), and the flange 78 comprises a width 79 (e.g. a diameter 79 when the flange 78 comprises a circular shape, as shown). Typically, the widths 77, 79 of the base 76 and the flange 78, respectively, are each greater than a width 86 of the elongated body 52. The width 77 of the base 76 is typically configured to be disposed within an aperture defined by a panel (not shown). In some embodiments, the width 77 is configured (e.g. sized and/or shaped) to abut an inner surface of the aperture defined by the panel, e.g. to limit the relative movement (play) therebetween when the base 76 is disposed within the aperture of the panel.

In the exemplary embodiment, the base 76 includes a cylinder 80, which comprises diameter 77 and is concentric with the inner and outer cylinders 70, 72 of the first end portion 58 of the elongated body 52. Typically, the first end portion 58 and the base 76 are interconnected by webs 82. Similar to the webs 74, the webs 82 interconnecting first end portion 58 and the base 76 function (e.g. by flexing) to absorb torsional, flexural forces, and radial forces exerted upon the spacer 50 during use, thereby reducing the forces imparted on the bolt used in combination with the spacer 50, as described above. In certain embodiments, the base 76 includes certain protrusions to assist in one or more functions of the spacer 50. For example, in some embodiments the base 76 includes locking tabs 84, which function together to resist withdrawal of the spacer 50 when disposed within the aperture of the panel. The base 76 may include any number of locking tabs 84, such as 1, 2, 3, 4, or more, which may be oriented in any configuration about the base 76. In the exemplary embodiment, the base 76 comprises two locking tabs 84, which are radially opposed about the base 76. The base 76 may also include securement members 48, which are configured to receive a portion of a hose, cable, or the like, or otherwise be secured thereto. In the exemplary embodiment, the securement members 48 extend from a top surface of the base 76. However, the base 76 may include any number of securement members 48, which may be the same as or different than one another, may comprise any independently selected shape, size, or configuration, and may extend from any surface of the base 76 (e.g. the top surface, a side surface, or both).

The flange 78 extends radially outward from the base 76. The flange 78 may be substantially flat, or may have a concave or convex shape along the axis about which the longitudinal opening 54 extends. In the exemplary embodiment, the flange 78 comprises a convex shape curving outwardly from the width 86 of the elongated body 52 and toward the second end portion 60 of the elongated body 52. Through flexure, the convexity or concavity of the flange 78 functions to assist in absorbing lateral forces exerted upon the spacer 50 during use, thereby also reducing the forces imparted through a shipping bolt utilizing the spacer 50.

As introduced above, the spacer 50 comprises a unitary construction. As such, various elements of the spacer 50, e.g. the elongated body 52, the head 56, etc., as described above, are all connected. Typically, the spacer 50 is formed from a single material, such as one of the resins described herein. However, the spacer 50 may comprise any number of materials, and each element of the spacer 50 may itself comprise a combination of different materials and not necessarily have a homogeneous composition throughout. Typically, the spacer 50 comprises a homogenous composition throughout, and is formed from a material having sufficient resiliency and elasticity to perform the functions described herein. In particular, physical properties of the material from which the spacer 50 is manufactured may further contribute to force absorption during use of the spacer 50, e.g. by deforming in response to an applied force. Examples of suitable materials include the thermoset and/or thermoplastic resins described above. In certain embodiments, the spacer 50 comprises one of the thermoplastic elastomers. In some of these embodiments, the spacer 50 comprises the polyolefin-type thermoplastic elastomer, such a thermoplastic elastomer comprising polypropylene.

An exemplary method of using of the spacer 50 includes disposing the elongated body 52 within an aperture in a panel (e.g. a back panel) of an appliance (e.g. a washing machine), thereby positioning flange 78 adjacent a surface of the appliance (e.g. surrounding the aperture). The method also includes disposing a bolt through the longitudinal opening 54 of the spacer 50, such that the ribs 68 and inner cylinders 70 are disposed about the bolt, thereby forming a shipping bolt comprising the spacer 50. The method further includes threadibly securing the bolt to a component of the appliance (e.g. an inner drum of the washing machine), thereby securing the component to the panel of the appliance with the shipping bolt comprising the spacer 50. The bolt may be threadibly secured to the component by threading into a threaded bore defined by the component, via use of a nut captured by the component, etc. In such a configuration, the spacer 50 is disposed about the bolt and between the component and the panel of the appliance, and thus positioned to absorb forces imparted therebetween during shipping.

In certain embodiments, the method further comprises securing the appliance to a structure (e.g. a wall or a rack of a transport vehicle) via the securement members 48. After shipment, e.g. when the appliance is delivered and is ready for use, the bolt may be unthreaded from the threaded bore of the component, and the spacer 50 and the bolt then removed from the appliance. As such, the method may additionally comprise unsecuring the bolt from the component and, also optionally, removing the bolt and the spacer 50 from the appliance. In this fashion, the spacer 50, and the shipping bolt formed therewith, may be reused. Accordingly, the method above may be understood as forming the shipping bolt with from the spacer 50, securing the component of the appliance for shipping with the spacer 50 or the shipping bolt formed therefrom, reducing forces imparted to the bolt or the appliance (e.g. the panel and/or the component) with the spacer 50 during shipment of the appliance, and securely shipping the appliance via utilizing the spacer 50.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A spacer for a shipping bolt comprising:
   an elongated body defining a longitudinal opening therethrough, the elongated body including an intermediate portion located between first and second end portions, the intermediate portion including lengthwise portions that are interconnected by ribs oriented in alternating directions and disposed about the longitudinal opening of the elongated body, wherein the ribs comprise a substantially U-shape with a curved portion recessed within the longitudinal opening; and
   a head integrally joined to the first end portion of the elongated body and extending radially outwardly therefrom.

2. The spacer of claim 1, wherein the first and second end portions each include an inner cylinder, an outer cylinder disposed about the inner cylinder, and webs interconnecting the inner and outer cylinders.

3. The spacer of claim 1, wherein the head includes a base having an outer diameter greater than an outer diameter of the elongated body, and a flange protruding radially outwardly from the base.

4. The spacer of claim 3, further including a securement member extending from a surface of the base and configured to receive a portion of a hose or cable.

5. The spacer of claim 3, wherein the base is connected to the first end portion of the elongated body by webs.

6. The spacer of claim 3, wherein a portion of the base is configured to fit within and abut an inner surface of an aperture within a panel.

7. The spacer of claim 1, wherein the spacer is formed of a single piece of a thermoplastic elastomer.

8. The spacer of claim 1, wherein the ribs comprise an overall shape generally resembling the Greek letter omega when viewed along an axis about which the longitudinal opening extends.

9. The spacer of claim 1, wherein the U-shaped portion of the ribs alternate along an axis about which the longitudinal opening extends.

10. The spacer of claim 1, wherein the ribs define a portion of the longitudinal opening about and along an axis about which the longitudinal opening extends.

* * * * *